Patented Dec. 1, 1936

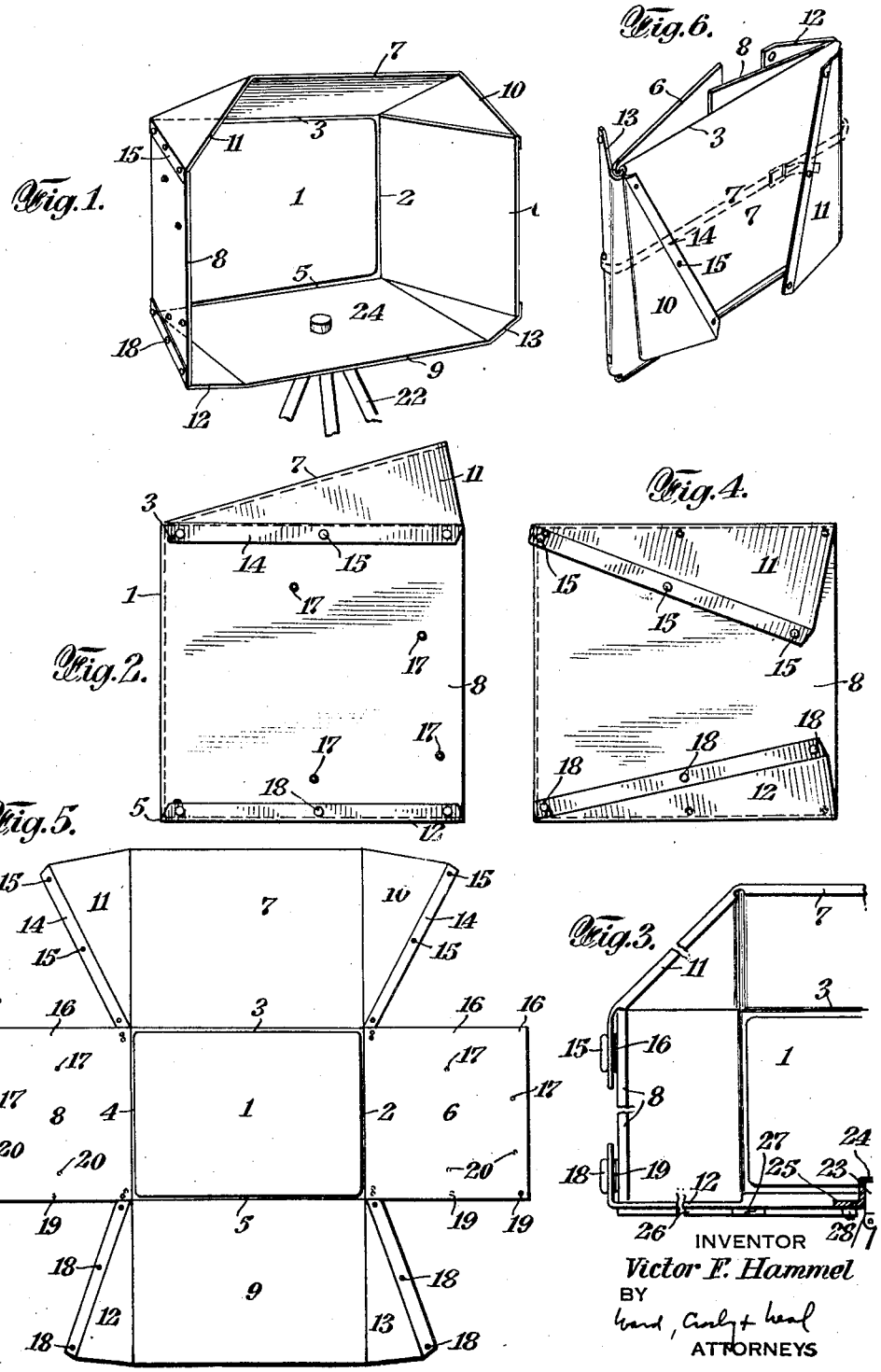

2,062,878

UNITED STATES PATENT OFFICE 2,062,878

PORTABLE PROJECTION SCREEN

Victor Frank Hammel, Richmond Hill, N. Y.

Application March 27, 1935, Serial No. 13,196

2 Claims. (Cl. 88—24)

This invention relates to portable devices for luminous image display, and more particularly to portable screens for use with motion picture projectors.

An object of the invention is to provide a portable self-supporting motion picture projection screen which may be reduced to flat and compact dimensions for convenient transportation, but which has integral therewith a collapsible hood or cowl so shading the screen in use that it may be utilized for daylight picture display without necessity for darkening the premises of display.

The hood is featured in that the shading effect may be varied by adjusting its angular aperture to accommodate the picture display to different degrees of extraneous luminous intensity or to the size of the audience.

In accordance with a preferred embodiment the invention comprises a stiff, substantially rectangular display screen to the respective edges of which stiff, preferably rectangular shading flaps are hinged or otherwise flexibly attached, with each flap extending along the entire edge to which it is attached so that in aggregate the flaps completely embrace the perimeter or the screen. Stiff insert flaps, preferably V shaped, are flexibly attached or hinged to the lateral edges respectively of one of the shading flaps; while, similarly shaped flexible insert flaps are attached to the lateral edges respectively of the oppositely disposed shading flap.

With the structure as described, all of the flaps may be folded against the screen and each other to reduce the device to flat compact dimensions for convenient handling and carrying about. To further this end, a strap may be passed about the device to retain the components in compact assembly, or the device as thus compacted may be slipped into a suitable case.

When it is desired to arrange the device for picture display, the shading flaps are swung into such position as to shade the screen from all sides with the insert flaps overlapping the contiguous shading flaps thereby to form a continuous hood. Means are provided for detachably fastening the so disposed insert flaps to the contiguous shading flaps in varying degrees of overlapping relation thereby appropriately to adjust the angular aperture of the hood to the intensity of extraneous illumination or to the size of the audience. Although the detachable joining may be effected in any suitable manner, it is conveniently accomplished by means of suitably disposed ball and socket components of snap fasteners such as are familiarly employed on gloves.

The flexible V flaps affixed to one of the rectangular flaps permit the hood on one side to assume the flat contour of a table or desk on which the screen is disposed for display purposes; while the stiff V flaps affixed to the opposite rectangular flap are adapted to maintain the remainder of the hood in inclined converging relation to the screen when a wide angle aperture thereof is desired.

In the absence of a convenient flat object on which to rest the screen, it may be mounted on a tripod provided with collapsible arms extensible laterally to support the side flaps and to maintain the flexible V flaps and the bottom rectangular flap substantially coplanar.

The invention finds utility in one of the more recent forms of advertising wherein a salesman, equipped with a portable screen and motion picture projector threaded with film illustrating his wares, canvasses prospective customers employing the projecting equipment for purposes of demonstration. This form of display is particularly effective in the selling of heavy, complicated machines which otherwise could not be viewed as conveniently by the customer, and the operation of which could not be understood nearly so well from the physical apparatus.

It is essential to general success of this scheme that the projecting equipment be so compact and conveniently portable that the salesman can carry it about unobtrusively. It must, moreover, be of such character that it can be set up at a moment's notice for display purposes and as rapidly disassembled and compacted for removal. Finally, the apparatus must be completely operative in self-contained form, requiring no auxiliary assistance from the office of a prospective customer such as the attachment of a sheet to the wall, the switching off of lights, or the shading of a room.

The present invention provides a portable screen which, in association with any of the many compact forms of portable motion picture projectors available on the market, meets all of these conditions.

Referring now to the drawing:

Fig. 1 is a perspective view of the screen as arranged for wide hooded aperture picture display;

Fig. 2 is a side elevation of the Fig. 1 arrangement;

Fig. 3 is a fragmentary front view of the left of Fig. 1;

Fig. 4 is a side elevation of the screen as arranged for narrow hooded aperture display;

Fig. 5 is a plan view of the device as flattened out prior to folding and as viewed from the side opposite the screen; and Fig. 6 is a perspective view illustrating the manner of folding and compacting the screen for transporting.

Referring to the several figures wherein like elements are similarly designated, the device comprises a stiff, substantially rectangular screen 1 on which the image or picture is projected. Flexibly secured to the respective edges, 2, 3, 4, 5 of the screen are stiff substantially rectangular shading flaps 6, 7, 8, 9. A pair of stiff substantially V shaped flaps 10, 11 are flexibly attached to the lateral edges of the rectangular flap 7; and a pair of substantially V shaped flexible flaps 12, 13 are secured to the lateral edges of rectangular flap 9.

The stiff flaps 10, 11 terminate in flexible strips 14, containing spaced socket portions, such as 15, of snap fasteners, the cooperating ball portions of which, such as 16, 17 are affixed to the contiguous shading flaps 6, 8, for purposes explained hereinafter. The flexible flaps 12, 13 are similarly provided with socket portions 18 of snap fasteners, the cooperating ball portions 19, 20 of which are affixed to the contiguous shading flaps 6, 8.

Manipulation of the device, whereby it is arranged for picture display or alternatively for transporting, are best explained by starting from the arrangement of Fig. 5 wherein all of the flaps have been swung into the plane of the screen 1. Assume first that it is desired to arrange the device for daylight picture display at maximum aperture of the hood, as shown in Fig. 1. To effect this, flap 6 may be grasped in one hand and flap 7 in the other, and the two rotated toward each other until the outer edge 14 of V flap 10 overlaps the lateral edge of the contiguous rectangular flap 6. In this position, the edge 14 of the V flap may be detachably joined to flap 6 by means of the snap fasteners 15, 16. Similarly, flap 9 may be swung into position for joining flap 13 to flap 6, by means of the snap fasteners 18, 19. Flap 8 may be swung into position for joining flaps 11 and 12 thereto by means of the snap fasteners 15, 16 and 18, 19 respectively, resulting in the arrangement of Fig. 1. wherein the thus formed hood 6, 10, 7, 11, 8, 12, 9, 13, completely shading screen 1 is arranged for maximum angular viewing aperture.

The hooded aperture may be made smaller for accommodation of but one or a few spectators or for screening off a maximum of extraneous illumination, by detaching the V flaps from the rectangular flaps and rotating the rectangular flaps until they are substantially perpendicular to the plane of the screen with their edges contiguous. With the rectangular flaps thus disposed, the V flaps will overlap the rectangular flaps in the manner of Fig. 4 wherein V flaps 11, 12 are disposed in completely overlapping relation to flap 8. As thus disposed, the snap fastening comprising portions 15, 17 and 18, 20 are brought into alignment for detachably joining the V flaps 11, 12 and 10, 13 to the shading flaps 8, 6 respectively, according to the arrangement of Fig. 4.

Referring now to Figs. 5 and 6, the screen may be compacted for transporting, by first folding the bottom shading flap 9 against the front screen, after which the top shading flap 7 may be folded against the bottom flap 9. The side shading flaps 6, 8 may then be folded back, one against the back of the screen and the other against the first. The stiff V flaps 10, 11 may be folded as shown in Fig. 6 against the back of the top flap 7, and the flexible V flaps 12, 13 against the side flaps. A strap 21 may now be secured about the device to retain the assembly as thus compacted.

Referring again to Fig. 1, the interior surfaces of the flaps 6 to 13 inclusive are preferably covered with some dark, non-specular light absorbing material, such as black fabric, etc., or are otherwise provided with a dull light absorbing finish.

In Figs. 1 and 3 the screen assembly is shown mounted on a tripod 22, terminating at its upper end in a threaded stud, screwed into an internally threaded thimble 24 projecting through an aperture in flap 9 and attached thereto by means of a peripheral flange 25. Secured to the tripod are laterally extending arms, such as 26, Fig. 6, jointed at 27, 28 for compacting. The arms when opened out as shown, extend beneath and support the side flaps 8, 6 while maintaining the flexible flaps 12, 13 and the bottom flap 9 substantially coplanar. By virtue of this mode of support, the remainder of the hood may be supported in inclined, converging relation to the screen as shown in Fig. 1.

What I claim is:

1. A combination portable motion picture projection screen and collapsible shading hood integral therewith for adapting said screen to daylight picture display, comprising: a stiff, opaque screen for receiving said image; stiff, opaque shading flaps hinged to and embracing the perimeter of said screen and including top, bottom and side shading flaps; flexible edged, opaque insert flaps hinged to the lateral edges of an opposite pair of said shading flaps at the top and bottom of said screen; said flaps being swingable to dispose the flexible edges of said insert flaps in overlapping relation to the contiguous shading flaps thereby to provide a boxlike structure with said screen at the rear and opaque protection walls shading the screen from all sides; and means including the flexible edges of said insert flaps for attaching said insert flaps to the contiguous shading flaps in a plurality of degrees of overlapping relation thereby to vary the angular inclinations of said shading flaps relative to said screen; the insert flaps at the bottom of said screen being sufficiently flexible to conform to a flat supporting surface; and the insert flaps at the top of said screen being sufficiently stiff as in cooperation with the contiguous side shading flaps to support said top shading flap at said angular inclinations relative to said screen.

2. A combination portable motion picture projection screen and collapsible shading hood integral therewith for adapting said screen to daylight picture display, comprising: a stiff, substantially rectangular, opaque screen for receiving said image; substantially rectangular, opaque top, bottom and side shading flaps hinged to and embracing the perimeter of said screen; flexible edged, opaque V flaps hinged to the lateral edges of said top and bottom shading flaps; said flaps being swingable to dispose the flexible edges of said V flaps in overlapping relation to the contiguous side shading flaps thereby to provide a boxlike structure with said screen at the rear and opaque protection walls shading the screen from all sides; and means including the flexible edges of said V flaps for attaching said V flaps to the contiguous side shading flaps in a plurality of degrees of overlapping relation thereby to vary the angular inclinations of said shading flaps relative to said screen; the V flaps at the bottom of said screen being sufficiently flexible to conform to a flat supporting surface, and the V flaps at the top of said screen being sufficiently stiff as in cooperation with the side shading flaps to support said top shading flap at said angular inclinations relative to said screen.

VICTOR FRANK HAMMEL.